United States Patent
Rempert et al.

[15] 3,670,153
[45] June 13, 1972

[54] MACHINE IMPLEMENTED METHOD FOR POSITIONING AND INSPECTING AN OBJECT

[72] Inventors: Lawrence Arnold Rempert, Ringoes; Edward Philip Helpert, Kendall Park, both of N.J.

[73] Assignee: RCA Corporation
[22] Filed: Oct. 8, 1970
[21] Appl. No.: 79,055

[52] U.S. Cl. .................. 235/151.11, 235/151.3, 250/202, 250/219 DF, 250/219 DR, 444/1
[51] Int. Cl. ................................................ G06f 15/46
[58] Field of Search .............. 235/151 P, 151.1, 151.11; 250/202, 211, 221, 222 R, 219 R, 219 FR, 219 DF, 219 DR, 219 WD, 219 LG

[56] References Cited

UNITED STATES PATENTS

| | | | |
|---|---|---|---|
| 3,598,978 | 8/1971 | Rempert | 235/151.11 |
| 3,207,904 | 9/1965 | Heinz | 250/202 |
| 3,029,348 | 10/1962 | Heinz | 250/221 |
| 3,515,877 | 6/1970 | Baxter et al. | 250/202 |
| 3,541,338 | 11/1970 | Duda et al. | 250/219 FR |
| 3,555,254 | 1/1971 | Gerber | 235/151.11 |

Primary Examiner—Felix D. Gruber
Attorney—H. Christoffersen

[57] ABSTRACT

The object it is desired to position has areas thereon whose peripheral edges are boundries between light and dark regions. For example, the areas may be metal electrodes which appear light and are located on a dark substrate. This object is placed beneath a light-sensing element such as an optical fiber. The object is then scanned in different directions under computer control, by producing relative movement between it and the light-sensing element to ascertain the shapes of a number of these areas, and the position within each such area of a characteristic point such as the center of gravity or the center of one particular edge, of each such area. The coordinates of these points are compared with reference coordinates previously stored in the computer memory for calculating the translational and/or the rotational movement required to center the object and for imparting this movement to the object.

11 Claims, 13 Drawing Figures

INVENTORS
LAWRENCE A. REMPERT &
EDWARD P. HELPERT
BY James Cohen
Attorney

INVENTORS
LAWRENCE A. REMPERT &
EDWARD P. HELPERT

BY *James Cole*
Attorney

MACHINE IMPLEMENTED METHOD FOR POSITIONING AND INSPECTING AN OBJECT

BACKGROUND OF THE INVENTION

In many industries where relatively high precision is important, it is often necessary during the manufacturing process accurately to position small objects. This is particularly true in the electronics industry where, for example, the bonding of an integrated circuit semiconductor "chip" to a "board" or "substrate" with printed conductors thereon requires the highly precise positioning of the board relative to the chip to permit the chip accurately to be bonded to the conductors at a particular location on the board.

The object of the present invention is to provide a system for precisely positioning an object automatically and at relatively high speed.

SUMMARY OF THE INVENTION

A plurality of regions on an object to be positioned are scanned to ascertain the positions of two crossings of each of a plurality of edges of each region. From the positions of the pairs of edge crossings for each region, the position of a given characteristic point for that region is determined. These positions are compared with previously stored information concerning the theoretical positions of corresponding characteristic points for a properly positioned object, and the direction and amount of movement needed to bring the object into a desired position is determined. This movement is then imparted to the object.

DETAILED DESCRIPTION

Figure 1:
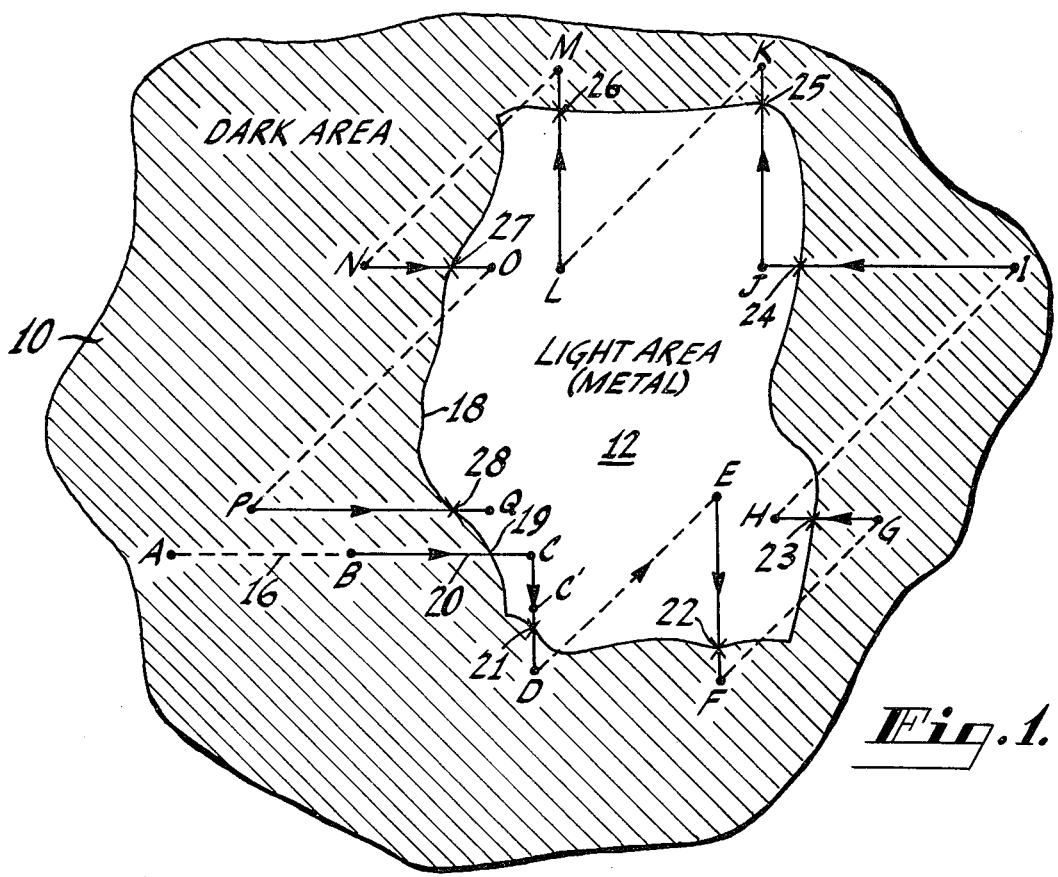
FIGS. 1, 3, 6 and 12 are schematic drawings of portions of a board or substrate to be positioned, illustrating how the substrate is scanned in order to ascertain the distance and direction the substrate must be moved to center it.

The portion of the printed circuit "board" or substrate shown in FIG. 1 includes an insulating medium 10 which is relatively dark and metal regions, one of which is shown at 12, which are relatively light. The metal regions are relatively small in size; for example, the shorter dimension of the generally rectangular area may be 2 to 4 mils (1 mil = 0.001 inch).

Figure 3:
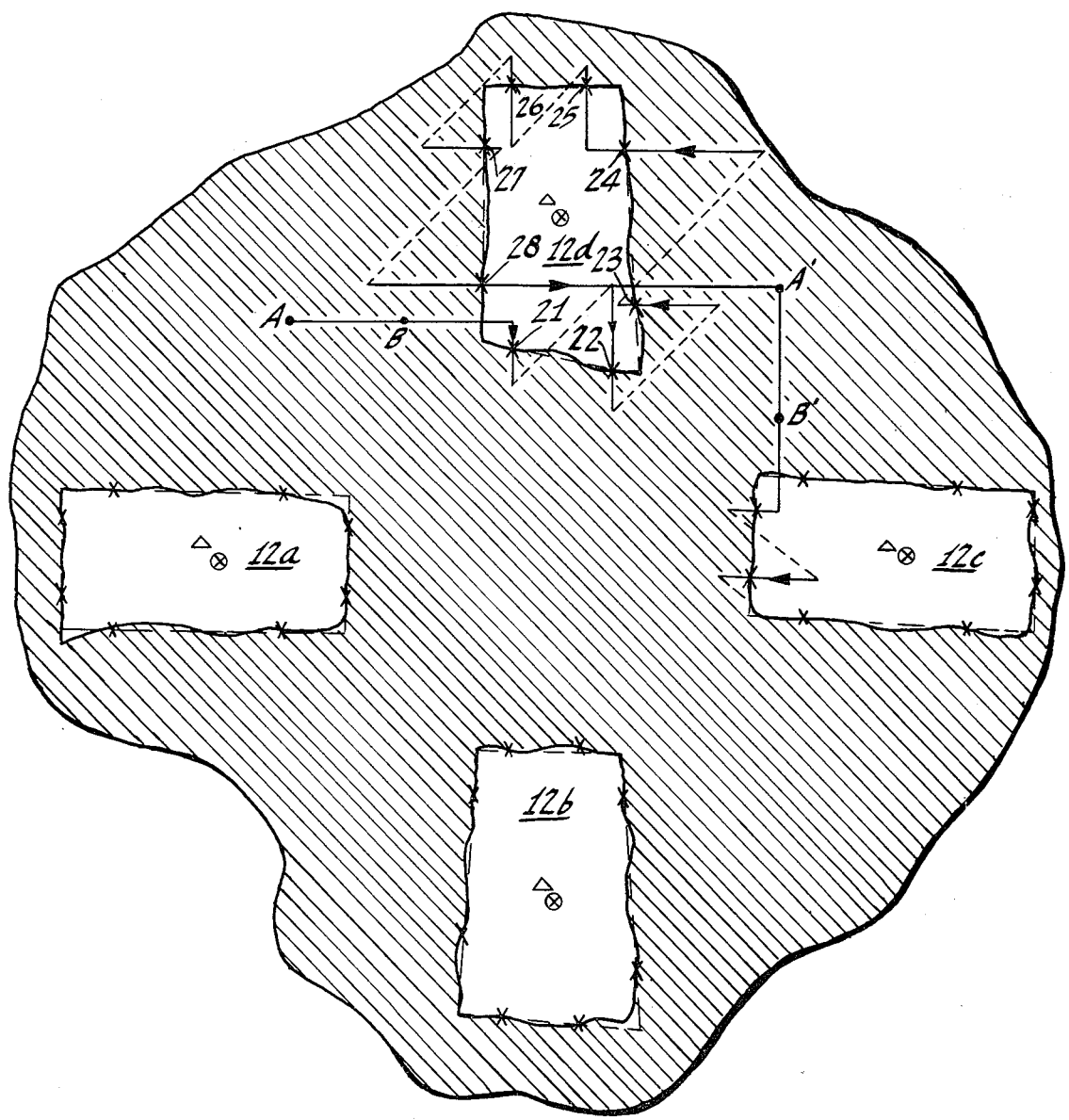

The entire board may contain many regions, each with a number, such as four, of metal areas, such as shown in FIG. 3. In such cases, each such region is adapted to have secured thereto a small "chip" (not shown) containing an integrated circuit which may include a number of interconnected semiconductor devices such as transistors. In the interest of simplifying the present discussion, it will be assumed that each substrate has only 4 metal areas (FIG. 3) to which one chip may be secured.

The chip itself (not shown) is mechanically held in a bonding tool (not shown) in a very accurately known-in-advance position above the board. The chip has metal "bonding pads" thereon in positions corresponding to the positions of the metal areas 12 on the board. However, before the chip can be placed in contact with and bonded to the board shown in FIG. 1, it is necessary very accurately to align the group of the metal areas 12a–12d, FIG. 3 on the board with these bonding pads on the chip.

One solution to the problem, and this is a solution which is often employed, is to do the positioning manually. The board, a portion of which is shown in FIG. 3, is placed on a table underneath a microscope and an operator manually moves the table until the metal areas at a desired region of the board are directly beneath the corresponding bonding pads on the chip. A split image optical device may be employed to help the operator accurately to superimpose the image of the metal areas 12 on the board over the bonding pads on the chip. In the interest of saving time and achieving greater accuracy, however, it is preferred to be able to perform the positioning automatically. The way in which this automatic positioning is performed in accordance with the present invention is shown in the various figures.

To start with, it may be assumed for purposes of the present introductory explanation that the board is placed in some predetermined position on a movable table. The initial alignment may be mechanical and may be achieved, for example, by securing the board tightly against alignment elements (not shown) such as pins, bars or the like, fixed to the table. Other mechanical alignment means are also possible.

If the initial alignment is highly accurate, a reference element, which in the present case is a fiber optics element of extremely small diameter (shown at 62 in FIG. 11), will be located at a known in advance position, A in FIG. 1 relative to one edge of one of the terminals 12. In practice, however, the boards are not absolutely uniform in size and, due to errors in printing, the metal areas are not necessarily of the same shape and in the same position on each board. Moreover, as is clear from the figures, the edges defining the terminals in themselves may be ragged or uneven. Therefore, in practice, the actual position of the fiber optics element relative to the closest edge of a terminal of interest may be from a fraction of a mil to several mils displaced from its theoretical position and even its direction from the edge may be different than expected.

After the initial positioning step discussed above, the first step in the centering procedure according to the present invention is to locate the first terminal 12 in FIG. 1. As mentioned above, A is the initial position of the fiber optics element. Its actual distance and direction from the edge 18 is not known precisely. To start with, the table is moved a given distance in a given direction as indicated by the dashed line 16 to position the fiber optics element over point B, which should be relatively close to edge 18 of terminal 12. (Note that here and elsewhere the arrowheads, which represent the movement of the fiber optics element relative to the substrate, are pointing in the direction opposite to the direction of table movement).

The movement of the table (and of the substrate) relative to the stationary fiber optics light receiving element can be considered a mechanical "scan" in the direction from B to C. Of course the scan may be accomplished instead by maintaining the object stationary and moving the fiber optics element as discussed later in this specification, and as a third alternative, the scan may be accomplished entirely electronically (with no physical movement needed) as is also discussed later.

Next, the table is moved along line 20 until the fiber optics element reaches the edge 18. The fiber optics element senses that it has reached this edge by the dark to light transition which occurs. In more detail, it is assumed in the present discussion that the fiber optics element is receiving light reflected from the object being positioned and, of course, when it reaches the edge 18 of the terminal 12, the amount of light it receives suddenly drastically increases. For purposes of the present explanation, it will be assumed that after the fiber optics element reaches a given edge, it advances a fixed distance beyond that edge, say to a point such as C in FIG. 1. During the relative movement of the fiber optics element from B past the edge 18 to C, a binary number indicative of the spacing between point B and edge 18 is generated and stored. This number may be added to a second binary number indicative of the spacing between points A and B to determine the precise spacing from the point A to the edge 18.

After the terminal 12 is found and the fiber optics element is over point C, the table is moved in various ways as indicated by the solid and dashed lines to determine various points along the four edges of the terminal 12. First, the table is moved along line CD and a binary number is generated and stored indicative of the distance between point C and the first crossing 21. (The crossing point 21 is sensed by the fiber optics element, by the light to dark transition which occurs at point 21). From this binary number and the previously generated binary numbers and the known starting position A of the fiber optics element the $x$ and $y$ coordinates of the crossing point 21 may be calculated.

After reaching point D, the table is moved a given distance in a given direction as indicated by the line DE. During this movement, no record is made of crossing of the edge.

After reaching point E, the table is moved along solid line EF and a binary number is generated and stored indicative of the distance between point E and the edge crossing point 22. Again, knowing this distance and the other data already mentioned, the $x$ and $y$ coordinates of crossing point 22 readily may be calculated.

The process above continues until a pair of points is found for each of the edges of terminal 12. For purposes of the present explanation, four such pairs of points are shown: 21, 22; 23, 24; 25, 26; 27, 28. However, it is to be understood that, in practice, the number of pairs which are necessary will depend on many factors such as the actual shape of the terminal, the quality of the manufacturing process, that is, the reproducibility of the terminal shape from terminal to terminal, the unevenness of the terminals and so on. In many instances, for example, only three edges of a terminal may be available at which dark to light or light to dark transitions occur and it has been found possible to employ the present invention to center substrates with such terminals. In other instances, each metal area may have more than four edges and here it may be desirable to obtain edge crossing point pairs for five, six or more such edges. In such cases, of course, the scanning algorithm will change accordingly.

Figure 2:
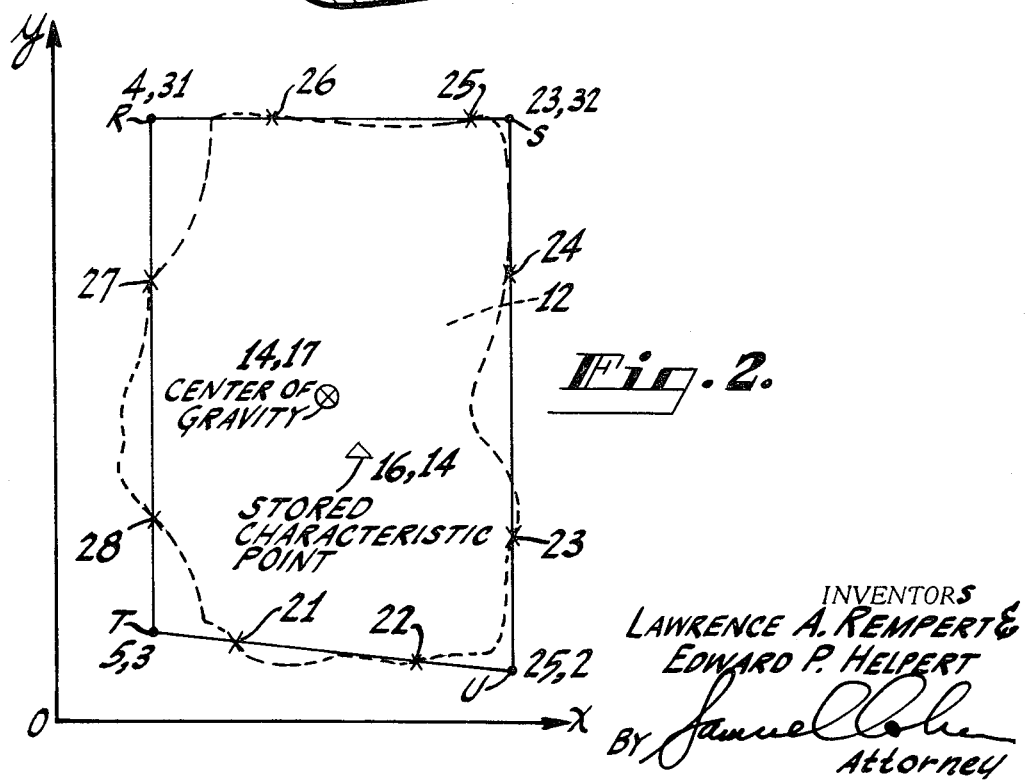
FIGS. 2, 4, and 5 are graphs to help explain the centering procedure.

After the measurements above have been made, the digital computer of the stored program type (shown in FIG. 11 and discussed later) processes the data in the manner shown graphically in FIG. 2. First it simulates the drawing of straight lines through each pair of crossing points as indicated by the solid lines in FIG. 2. (To improve the clarity of the drawing, the outline of the terminal 12 is shown by dashed lines in FIG. 2.) The result of this operation is to simulate a quadrilateral which, if the terminal is a perfect one, will be a rectangle. In general, however, the opposite sides are not parallel nor are the corner angles right angles. The computer is programmed to calculate the coordinates at the corners of this quadrilateral. It is simple algebra to perform this calculation knowing the coordinates of the points such as 21 and 22 and so on which lie on the sides of the quadrilateral. It involves obtaining the equation for each straight line and solving pairs of equations to obtain the $x$, $y$ coordinates at the four points where the four lines cross. The computer is also programmed to calculate from these corner coordinates a "characteristic point" such as the center of gravity of this quadrilateral. This center of gravity has been found empirically to closely approximate the actual center of gravity of the terminal itself.

The center of gravity above may be calculated by adding the x-coordinates of the crossings to one another and dividing by the number of such coordinates, and the y-coordinate of the center of gravity may be calculated in similar fashion. In the specific example given by way of illustration $x_{cg} = (4+5+25+23/4) \cong 14$ and $y_{cg} = (31+3+32+2/4) = 17$.

The digital computer stores in its memory a calculated in advance theoretical characteristic point for a perfectly centered terminal. The position of this theoretical point in the present example is $x = 16$, $y = 14$ and is indicated by a small triangle in FIG. 2. It is clear that this theoretical point is not at the same position as the actual center of gravity of the terminal and it will be necessary, if it is desired that these two points exactly correspond, that the table be moved an amount $\Delta x = +2$ and $\Delta y = -3$.

FIG. 3 illustrates four different terminals on a substrate. The substrate is scanned in the manner illustrated in part in the figure. To start with, the terminal 12d may be scanned in the same manner as already discussed. Next, the terminal 12c may be scanned in similar fashion (only some of these scan lines are shown) then the terminals 12b and 12a also may be scanned. As a result of the date gathered in this way and calculations subsequently performed, the centers of gravity of the four terminals may be calculated to be at positions shown by the crosses within the small circles, whereas the theoretical centers of gravity may be as indicated by the triangles. In order to center the substrate of FIG. 3, it may be necessary to move the substrate translationally, that is, in $x$ and $y$ directions and/or it may be necessary to rotate the substrate through some angle $\theta$.

Figure 4:
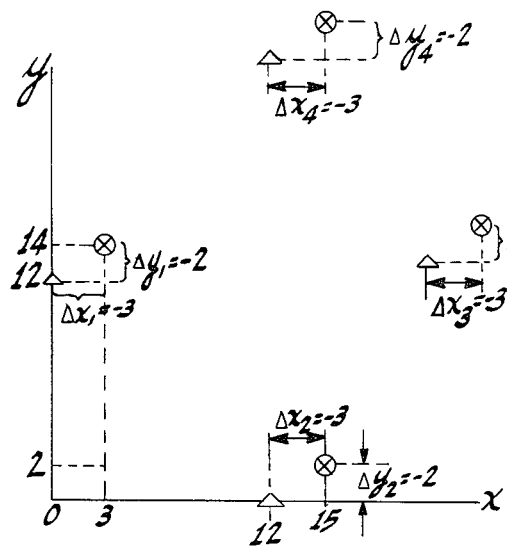

An idealized translational movement of the substrate is illustrated graphically in FIG. 4. The term "idealized" is employed because in this particular case each calculated center of gravity is displaced from its theoretical value by the same amount in the same direction. Clearly, the substrate may be centered in the FIG. 4 case by translational movement thereof in amounts $\Delta x = -3$ and $\Delta y = -2$. In the more general case, the amount of translational movement desired is calculated by adding the $\Delta x$'s to one another and dividing by the $\Delta x$'s present and the same method is employed for determining $\Delta y$. Thus, in the specific example of FIG. 3, $\Delta x = (x_1 + x_2 + x_3 + x_4/4)$ and $\Delta y = (y_1 + y_2 + y_3 + y_4/4)$.

In general, while the movement $\Delta x$, $\Delta y$ brings the substrate position into the best possible agreement with the theoretical position, the match usually is not perfect.

Figure 5:
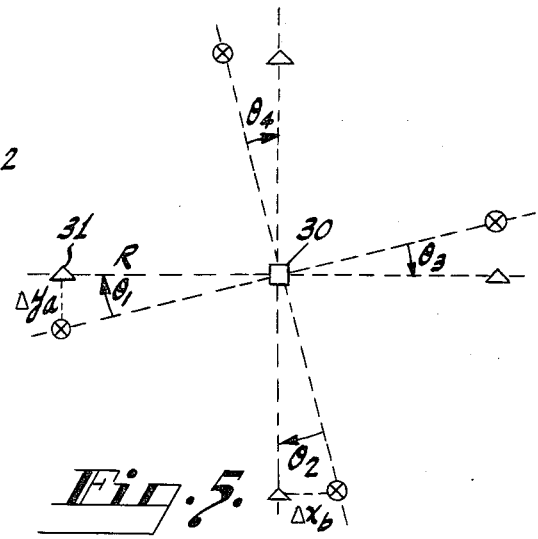

It sometimes occurs that the substrate must be rotated to get it into the best possible position. A case such as this is shown in FIG. 5. It may be assumed for purposes of this discussion that FIG. 5 represents the position of the substrate after the $x$ and $y$ corrections have been made. Clearly, no additional amounts of change $\Delta x$ or $\Delta y$ can get any center of gravity of a terminal closer to its theoretical position without at the same time throwing the center of gravity of another terminal further away from its theoretical center of gravity. However, if the substrate is rotated about the theoretical center of gravity shown within the small square 30, through a small angle $\theta$, the substrate can be brought into a position almost perfectly in alignment with its theoretically centered position. Again, in general, the match will not be perfect.

As in the previous cases, the amount of rotational movement which is needed readily may be calculated in response to stored program instructions in the digital computer. To start with, the computer knows the center of gravity position 30 of its four centers of gravity shown by the four triangles. The distance $\Delta y_a$ readily is calculated in response to stored program instructions in the manner already indicated. The radial distance R between the theoretical center position 30 and the terminal center of gravity 31 is known in advance and is stored in the computer. The angle $\theta_1$ readily may be calculated by the computer from the formula $\tan \theta_1 = (\Delta y_a/R)$. In similar fashion, the values of angles $\theta_2$ $\theta_3$ and $\theta_4$ readily may be calculated. The amount of rotational movement to be imparted to the table is $\theta_1 + \theta_2 + \theta_3 + \theta_4/4$.

Figure 6:
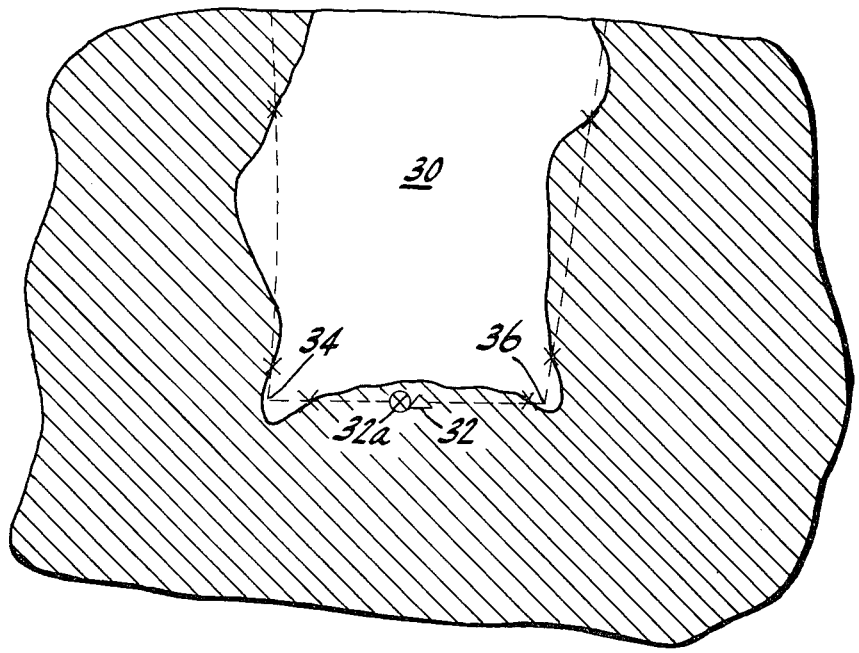

In the illustrations of FIGS. 1–5, the terminals have four edges available for scanning and the characteristic point of each terminal is chosen as the center of gravity of the terminal. In some cases, however, as is shown in FIG. 6, it is found more convenient to scan only three edges of a terminal (30 in FIG. 6) and to chose a characteristic point other than the center of gravity. It was found, in practice, that with a terminal 30 such as shown in FIG. 6, it was possible to obtain accurate centering of the substrate with a characteristic point at the center of one edge of the terminal. A theoretical characteristic point of this type is shown at 32 in FIG. 6. In other respects, the method employed for scanning the edges, constructing a straight sided figure (shown by dashed lines in FIG. 6) by drawing lines through the edge crossings, and calculating the corner coordinates 34 and 36, is the same as that already described. In this particular example, the measured characteristic point 32a is slightly displaced from the theoretical one 32.

In the discussion up to this point, the fiber optics element is stated to sense light reflected from a dark substrate or a light terminal. It is to be understood that the invention also can make use of transmitted light. This approach may be employed with a so called beam lead board or substrate. Here, a terminal such as 30 (FIG. 6) extends beyond the edge of an insulating substrate. The terminal is illuminated from below so that when either the terminal or the substrate is between the light source and the fiber optics element, little or no light reaches the fiber optics element. When, however, the light source is not blocked from the fiber optics element by a beam lead, light at relatively high intensity reaches the fiber optics element.

The apparatus for performing the positioning described above is illustrated in FIG. 11, and the flow charts for the operation of the apparatus are shown in FIG. 7–10. Both FIG. 11 and the flow charts should be referred to in the discussion which follows.

The board or substrate 50 is located on a rotatable table 51 and the latter is mounted on an XY table 52. The board is illuminated by a light source 54 and reflector 56 within a microscope-like apparatus 57. The light produced by the source and reflected from the reflector is projected onto a mirror 58 and from the mirror onto a restricted area of the board. The light reflected from the board is focused by a lens system, illustrated schematically by the single lens 60, onto the end of a fiber optics element 62. This light passes through an aperture in mirror 58 or, as an alternative, a half-silvered mirror may be employed.

The microscope 57 also includes a lens 63 to permit viewing of the region of the board 50 over which the end of the fiber optics element is located. In practice, this end is positioned in the center of the field of view. The microscope is maintained in a fixed position relative to the table and relative to the bonding head (not shown) used for holding the chip (not shown) and bonding the chip to the board 50 below.

The fiber optics element is of very small diameter as, for example, 2.0 mils. The effective area viewed is one-tenth this size, that is, 0.2 mil, due to the use of an objective lens having a magnification of ten. Light passing through the fiber optics element is applied to a photomultiplier 64 and the direct current level produced by the photomultiplier is amplified by the amplifier 66. The latter applies its output to one input to comparator 68. The second input to the comparator is a direct current level produced by the dark reference level circuit 70. The latter may, for example, include a direct voltage source, a potentiometer connected to said source and a lead from a tap on the potentiometer to the comparator. The output produced by circuit 70 may be adjusted by a servo circuit within block 70. This servo circuit, upon command from the computer, is closed and drives the potentiometer tap to a position such that the comparator output is at a predetermined value.

The drive means for the XY table 52 and X and Y stepping motors 72 and 74, respectively. AND gates 76 and 78, when enabled, permit oscillator 80 to apply pulses to the respective motors for energizing said motors. Each pulse causes the motor to move the table a distance of 0.10 mil. The pulses applied to the motors are also applied to X and Y counters 82 and 84, respectively. The counts recorded by these counters therefore are indicative of the number of pulses applied to the respective motors and are also indicative of the distances in the X AND Y directions through which the X AND Y motors have moved the table 52.

The rotatable table 51 may be mounted for rotation about an axis (not shown) extending perpendicularly from the surface of the XY table 52. The drive means for table 51 is a stepping motor 85 which may be mounted on the table 52 and coupled through gearing (not shown) to an axle (not shown) on which the table 51 is mounted. (As an alternative the rotatable table may be rotatably mounted to a chassis and the XY table mounted on the rotatable table). AND gate 87, when enabled, permits the oscillator 80 to apply pulses to motor 85 for energizing said motor. Each pulse causes the motor to rotate table 51 through a fraction, such as one-tenth, of a degree. The pulses applied to the motor are also applied to a counter 89 and the count recorded by this counter therefore is indicative of the angle $\theta$ through which the table 51 (and therefore the substrate 50) has been rotated.

The operation of the system is under the control of a general purpose digital computer 90 of the stored program type as, for example, one of the RCA Spectra 70 computers or any other general purpose computer such as a Digital Equipment Corp. PDP8 computer. For purposes of the present explanation, it will be assumed that many of the control steps are performed internally of the computer 90 under program control, however, it is to be understood that control circuits external of the computer could be employed instead. The decision, in each case, as to how much of the operation will be performed under program control and how much under "hardware" control depends upon practical considerations such as the size of the computer, the time which is available for the computer to devote to table positioning and so on.

Figure 11:
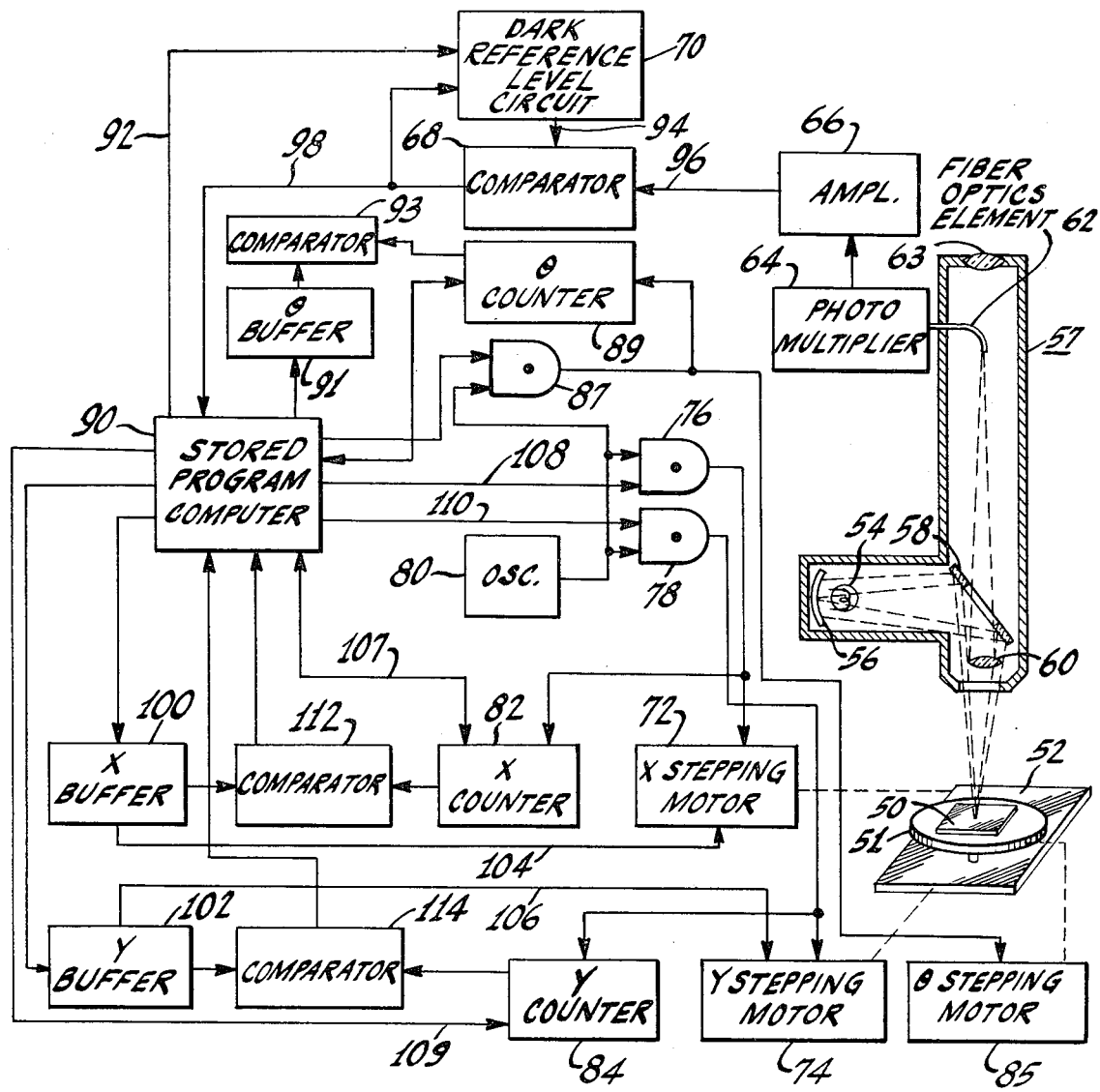
FIG. 11 is a block circuit diagram of apparatus according to an embodiment of the invention.

In the following discussion of the operation of the system shown in FIG. 11, several of the figures including the flow charts and FIGS. 1 and 11 should be referred to. The board 50 initially is placed in a predetermined position on the table such that the fiber optics element is located over point A (FIG. 1). There may be located beneath this position a reflective area so that in the absence of a board, light reaches the fiber optics element and when the board 50 moves into position, the light reaching the fiber optics element reduces to a low value (dark). This change in light level indicates to the system that the "workpiece is present" (see chart 7). Next, upon command from the computer 90 via line 92, the servo-loop in the system 68–70 is closed and the direct voltage level on lead 94 is adjusted to a value close to that of the direct voltage level on lead 96. When the adjustment is completed, the comparator output present on lead 98 drops to a predetermined level and the computer 90 then causes the servo-loop of the system 70–68 to open. The dark reference level circuit is now adjusted.

The computer 90 now causes to be stored in the X buffer 100 a number indicative of the amount of movement in the X direction desired from point A (FIG. 1) to point B. The direction of movement may be indicated by a single binary digit, the value of which, 1 or 0, indicates to the X motor 72 whether clockwise or counterclockwise rotation is desired. The information is communicated from the X buffer to the X motor 72 over lead 104.

The computer also resets the X counter 82 via line 107. The computer then applies an enabling signal via lead 108 to the AND gate 76.

When the AND gate 76 is enabled, oscillator 80 applies pulses through this gate to the X stepping motor, which pulses drive the table the desired amount in the desired direction. When the table reaches a position such that the fiber optics element is located over point B, the count recorded in the X counter 82 is equal to a corresponding count recorded in the X buffer 100. In response to this condition of equality, the comparator 112 produces an output which is applied back to the computer and the computer thereupon applies a disabling signal to the AND gate 76 to prevent further pulses from reaching the motor and in this way to stop the motor.

After the operation described above, the computer clears the X counter, places a direction command in the X buffer and then causes the X stepping motor to drive the table 52 in the direction of solid line BC (FIG. 1). This is done by enabling only AND gate 76. During the movement of the table, the X counter 82 counts each oscillator pulse and the computer continually senses for the presence of a signal on lead 98 which indicates that the light area has been reached. Note that the starting position for this scan in the X direction is position B in the dark area and the scan should be terminated slightly after the fiber optics element senses the edge 18, that is, slightly after the fiber optics element is over crossing 19. Shortly after a signal indicative of edge 18 is produced at lead 98, the computer disables AND gate 76 and the X stepping motor stops. The number stored in the X counter now is indicative of the distance from B to C through which the stepping table has moved. This number is transferred from the counter to the memory of the stored program computer via line 107.

During or prior to the start of the movement described above, the computer transfers to the Y buffer 102 a direction command to indicate movement in the direction CD (FIG. 1). After the fiber optics element reaches C, the computer clears the Y counter, and then enables AND gate 78. Now the Y stepping motor 74 causes the table 52 to move in the Y direction until the fiber optics element crosses the edge at 21. At edge 21 there is a light to dark transition and the comparator 68 applies a pulse to the stored program computer. If desired, this pulse signal can be employed to disable AND gate 78 to cause the Y stepping motor to stop. However, in practice, the computer 90 maintains the gate 78 enabled for a sufficient number of additional pulses to permit movement of the fiber optics element to point D. The reason for going beyond the edge is given later.

When the fiber optics element reaches position D, the count stored in the Y counter is transferred back to the computer 90 and the latter calculates from this count the distance from C to 21. The way in which this calculation is performed is simply to subtract the distance 21 to D from the distance C to D. Knowing the assumed starting position and the distances from A to B and B to C, the computer then or at a later time calculates the X and Y coordinates of the edge crossing point 21 and stores these coordinates in its memory.

After the step above, the computer 90 clears the X and Y counters and transfers to the X and Y buffers both direction commands and distance commands. The direction commands are such that the X and Y stepping motors move the table equal amounts to obtain movement of the table at an angle of 45° as indicated at DE in FIG. 1. After the information has been transferred to the buffers 100 and 102, the computer 90 enables both AND gates 76 and 78 and the X and Y stepping motors 72 and 74 drive the table 52. When the number of pulses applied via the AND gates 76 and 79 to the X and Y counters 82 and 84 equal the numbers stored in the X and Y buffers 100 and 102, respectively, the comparators 112 and 114 each produce an output pulse. These pulses are sensed by the computer 90 and the latter disables the AND gates 76 and 78.

After the steps above, the computer moves the table in a manner similar to that already discussed to obtain the remaining seven edge crossings 22, 23...26, 27, 28. In each case, the X and Y coordinates of each edge crossing point are stored in the memory of the computer. Thereafter, the computer, in response to stored program instructions, calculates from these eight XY pairs the quadrilateral which passes through all eight points as shown in FIG. 2. Thereafter, the computer calculates the coordinates of the four corners R, S, T, U (FIG. 2) of the quadrilateral also in response to stored program instructions. Thereafter, the computer, still in response to stored program instructions, calculates the coordinates of the position of the characteristic point of the quadrilateral. It stores this information in its memory.

Prior to or concurrently with the procedure above, the computer does the same measurements as already described for the three remaining terminals (12a, 12b and 12c in FIG. 3) and calculates for each such terminal the coordinates of its characteristic point (the center of gravity in this instance). After this calculation, the computer calculates both the translational and rotational movements required to "center" the board 50 in the manner already discussed.

After the calculations above all have been completed, and these calculations only take a small fraction of a second, the computer 90 supplies to the buffers 100 and 102 translational direction commands and translational distance commands and supplies to the θ buffer 91 both a direction command and an angle command—the latter in the form of a count of a number of pulses. Thereafter, the computer 90 enables all three AND gates 76, 78, and 87 and the three motors 72, 74 and 85 drive the board 50 to the position called for. The X and Y motors 72 and 74 drive the XY table 52 in the X and Y directions and the θ stepping motor 85 drives the rotatable table 51 through an angle θ relative to its original position.

The various steps discussed above are all contained in the flow chart of FIGS. 7–10. These flow charts also include additional steps related to the present invention. They are discussed briefly below.

Figure 7:
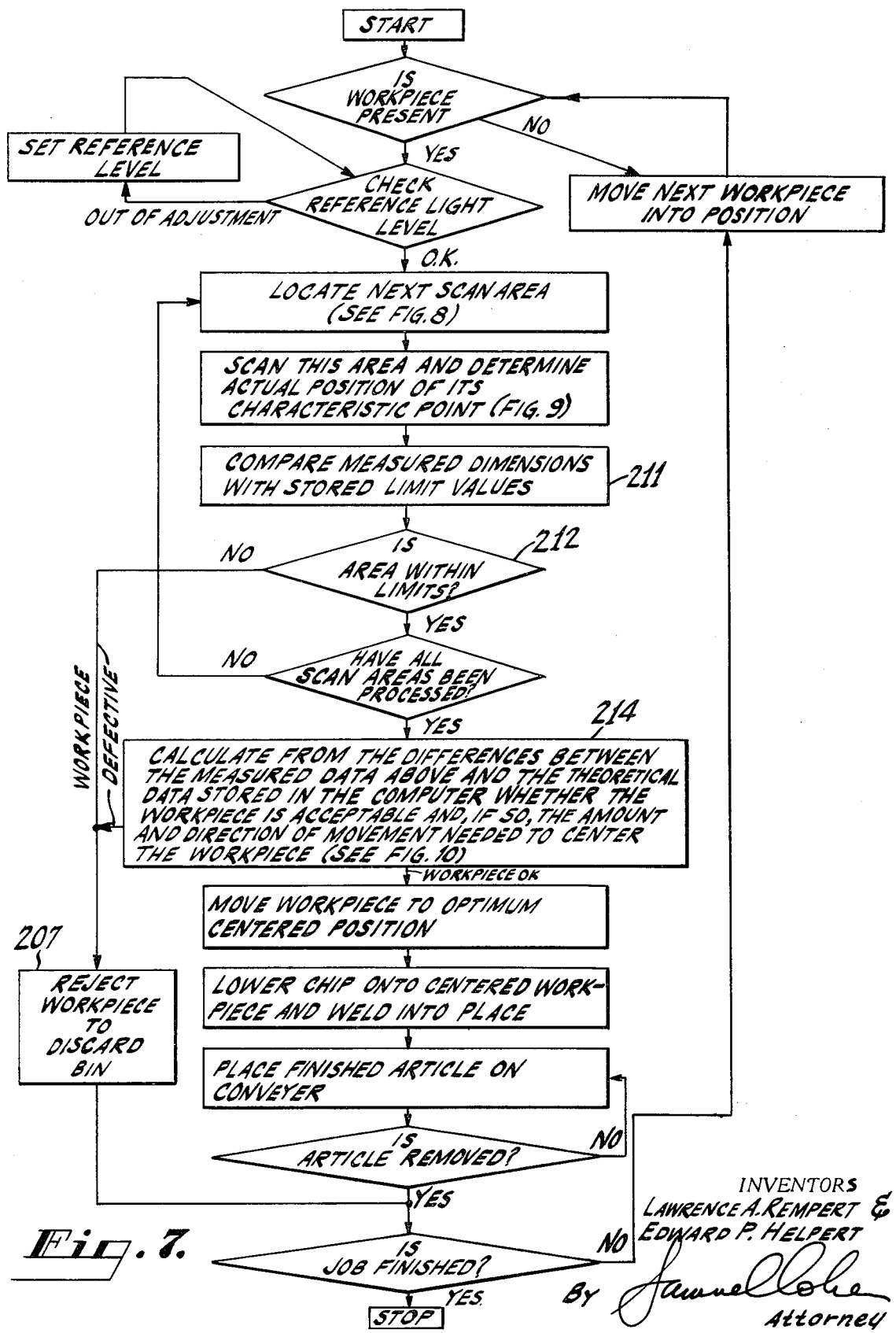
FIGS. 7, 8, 9, 10 and 13 are flow charts which illustrate the positioning method of the invention.
Figure 8:
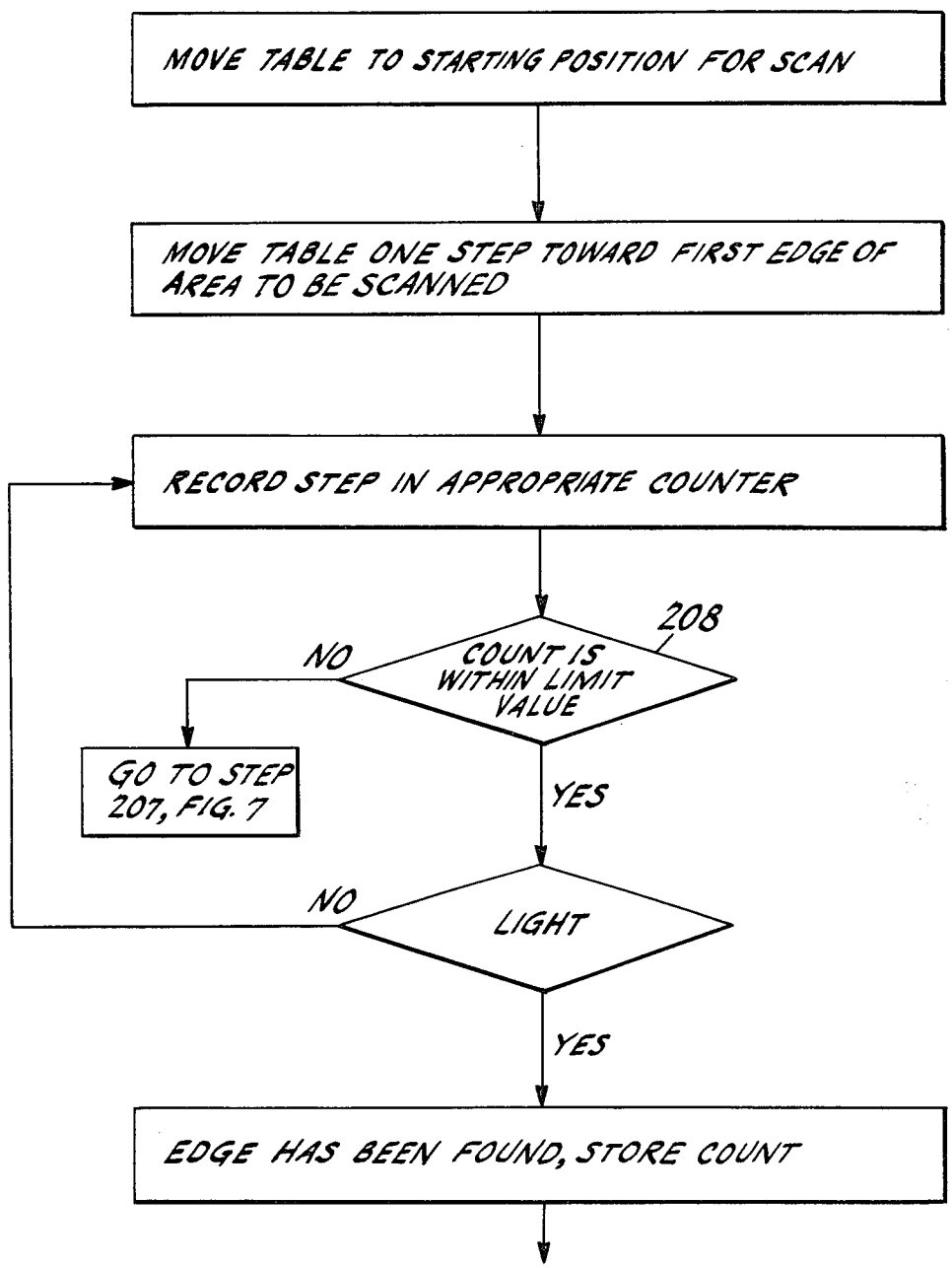

The "is workpiece present" step has already been discussed. The "reject workpiece" step 207 of FIG. 7 is included for boards which it is found for one reason or another are not acceptable. The computer 90 has certain limit values stored in its memory. For example, there is a limit value indicative of the distance A through C which is stored and, in practice, if an edge 18 (FIG. 1) is not sensed within that limit (see 208 in FIG. 8), the board is assumed to be defective.

If the scan for the first edge is successful and all of the crossing points have been obtained, the computer simulates a model of the straight sided figure whose sides through the edge point crossing pairs in the manner already indicated. In FIG. 2 the crossing points are 21 through 28 and the straight sides are TU, US, SR and RT. The computer stores in its memory limit values the straight lines must be within for the board to be acceptable. After the computer simulates the model of the quadrilateral, it calculates the lengths of the quadrilateral sides and compares these lengths against the stored limit values. For example, a terminal width check is made by comparing the computed lengths of SR and TU with the stored width limit values. Similarly, a length check is made by comparing the computed lengths of lines RT and SU with the stored limit values of these line lengths. If in any of these cases the calculated length of a straight line differs from the theoretical length by greater than a given value, the board containing that terminal immediately is discarded as illustrated at 211, 212 and 207 of the flow chart of FIG. 7.

Figure 12:
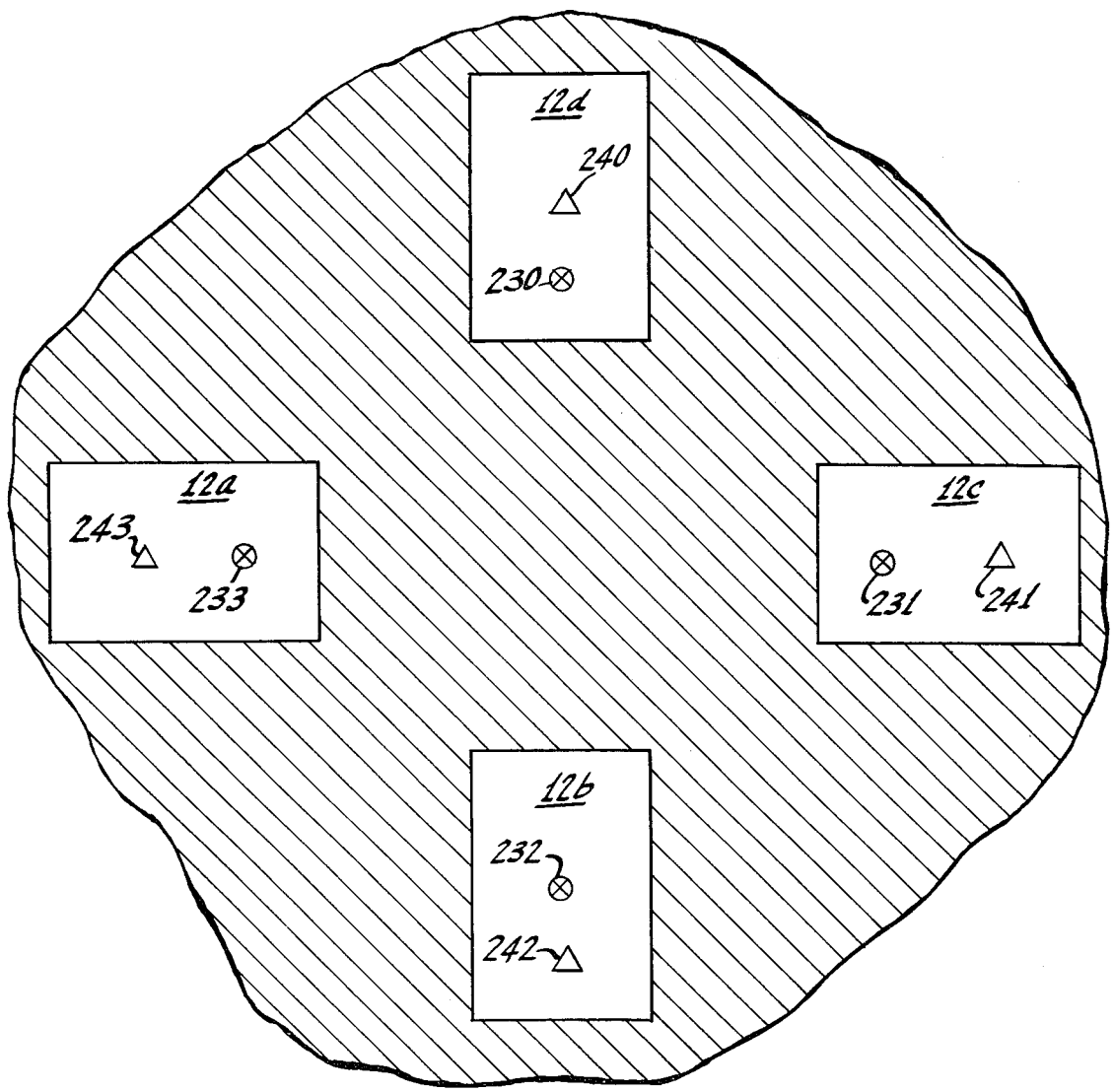

FIG. 12 illustrates yet another basis on which a board may be rejected. The triangles 240–243 represent the stored characteristic points for each scan area and the circles with crosses 230–233 represent the measured characteristic points after the computer has simulated the mathematical movement of the substrate to its "best match" position. The computer now calculates the distance between corresponding stored and measured points that is, the distances from 230 to 240, from 231 to 241, and so on. These distances are a measure of how well the part can be aligned with the theoretically desired position. Of course, the smaller the distances, the better the alignment which is possible for the part. The computer stores in its memory an upper limit to the amount of misalignment which can be tolerated and if the computed distances above exceed these limits, the part is rejected because it can not be brought into proper alignment (see steps 214 and 207 of FIG. 7).

It was mentioned earlier that when scanning a metal terminal to determine the position of the edge, the scan may be stopped as soon as the edge is reached. This mode of operation is perfectly satisfactory when the metal terminals do not contain imperfections such as scratches or other blemishes which are a different color than the metal. However, if the terminals should contain such scratches, the system may mistake a scratch for a terminal edge and this, of course, would be disadvantageous in the centering operation.

In the preferred form of the invention, means are provided for distinguishing between scratches or other imperfections and an edge. The two are distinguished by making use of the property of imperfections that they are normally relatively narrow—normally less than 1 ½mils in thickness. One and one-half mils corresponds to 6 steps of the stepping table (¼ mil per step).

In operation in this mode, during a scanning operation such as one starting at C of FIG. 1, the computer always stores a number indicative of the amount of light reaching the comparator during the six previous steps of the table. For example, when the fiber optics element reaches edge crossing 21 the AND gate 78 remains enabled and the table continues to move. The fiber optics element, as soon as it passes the edge, sees the dark area and a first count of 1 (001) is stored in the computer. The next step in the table a second dark area is observed and this information too is stored in the computer as 010. When there are indications of six successive dark areas (when the stored number is 110), the computer disables the AND gate 78 and stops the motor. At a later time when the calculations are made, the quantity of six is subtracted from the count indicative of the actual distance scanned to obtain the correct distance from the point C to crossing 21.

Suppose now that during the movement from C to 21 the fiber optics element encounters a relatively dark scratch in the metal area. When the fiber optics element reaches this scratch, the comparator 68 produces an output and a number is stored in the computer indicative of the presence of the dark area. However, the gate 84 remains enabled the counter 84 continues to count and the scan continues until six successive such signals are received. If, say after three such signals the end of the scratch is reached, the fiber optics element again "sees" reflected light at high amplitude and this is signalled to the computer via line 98. Thereupon, under program control, the number 011 stored in the computer indicative of a dark area three steps (0.75 mils) wide is changed back to 000. Since a scratch normally is less than 1 ½ mils in width (the equivalent of 6 steps of the table) the scan will continue over the scratch ignoring the scratch and the counter 84 will continue to count the distance from C. If the scratch is greater than 1 ½ mils in width, the computer will cause the Y stepping motor to stop before the edge (crossing 21) of the terminal has been reached. This means that the computer 90 will calculate a quadrilateral of the wrong shape and that the center of gravity too will be off. This, in turn, may mean that the board will be discarded. However, the board should be scrapped anyhow as a scratch 1 ½ or more mils in width can be expected adversely to affect the operation of the printed circuit.

In a practical embodiment of the present invention the table 52 and its associated motors are commercially available. For example, these three units are included in a system manufactured by TAC Corporation, identified as Model No. X–Y 500. As already mentioned the system may be operated under program control in a manner shown in FIG. 3. However, as an alternative, an external motor control system, such as the SLO–SYN SP 250 Preset Indexer—a commercially available unit, may be employed instead. The stepping motor 85 may be of the same general type as the motors 72 and 74.

It is also to be understood that while one specific embodiment of the invention has been described, many alternatives are possible. As one example, the counters, such as the X and Y counters, may be backward counters. The number stored in a buffer such as the X buffer 100 may be transferred to the X counter and the X counter caused by the oscillator 180 to count backward until the count stored by the counter is zero. In this case, the comparator such as 112 would be replaced by a zero count detector.

It is also to be understood that while in the present example the fiber optics element is fixed to a bonding machine (not shown) which is rather massive compared to the board 50 so that it is preferable to move the board and to maintain the bonding machine and fiber optics element stationary, another mode of operation is possible. In cases in which the object is relatively massive and the means employed to machine or otherwise interact with the object is relatively small, it may be preferred to maintain the object stationary and to move the fiber optics element and the machine to which the fiber optics element is secured.

In the embodiment of the invention discussed herein, the substrate is dark and the metal areas are light. It is to be understood that the invention is equally useful for centering boards with relatively light substrates and relatively dark metal areas. In these cases, the initial adjustment of the comparator 68 can be exactly as in the case already discussed or the comparator may be adjusted to produce a predetermined minimal output when the fiber optics element is pointed at the light substrate. The system of FIG. 11 readily can handle boards of this type mixed in with the boards having dark substrates and the selection of an appropriate stored program may be automatic and may be in response to an identification mark on the board.

In the system of the present invention as discussed up to this point, initially the board is moved through some predetermined distance AB and then is moved through a measured distance B to 19 until an edge is found, and then is moved from 19 to C. After reaching position C the board is moved from C through 21 to D, a second measured distance. In some types of terminals, it may be desirable when going from C to 21 to first move a known in advance distance say from C to C' and then to start looking for the edge crossing 21. The same may hold for the scans of other edges and it is to be understood that this type of movement is within the scope of the present invention.

When scanning from a dark area to a light area, there is a certain amount of hysteresis between the time that the fiber optics element reaches an edge and the time that the comparator 68 produces a pulse to so indicate. Similarly, there is a certain amount of hysteresis effect when scanning from a light area to a dark area as, for example, from L through 26. The two effects generally are unequal, that is, the time interval between an edge crossing from dark to light and the generation of a pulse is different than that between the crossing from light to dark and the generation of a pulse. For this reason, the scans along one edge are always in the same direction, that is, the scan, for example, from G to H in FIG. 1 from dark to light as is the scan from I to J. In addition, so that the hysteresis effect will have no significant bearing on the calculation of the actual position of the terminal, the scan of the opposite edge (18 in this instance) is also from dark to light. In other words, the scan N, 27, O is from dark to light as is the scan from P through 28 to Q.

So long as the above rules are followed, it does not matter whether an edge is sensed by going from light to dark or from dark to light. Thus, the lower edge in FIG. 1 is sensed by going from light to dark C, 21, D; E, 22, F. However, in view of this, the upper edge must also be sensed by going from light to dark: L, 26, M; J, 25, K.

While in the illustrated embodiment of the invention, scanning is achieved by physically moving the board or substrate relative to the fiber optics element, it is to be understood that the scanning may be all electronic instead. In this type of arrangement, during the scanning procedure, the board is maintained in a stationary position and is scanned, for example, by a flying spot scanner or other electronically scannable light source and suitable optical elements. As a second alternative, a television pick up tube such as a vidicon, image-orthicon or the like may be used to receive the image of the board, after magnification if desired, and the positions of the edge may be determined by raster or in other ways scanning each terminal of the picked-up image. In other respects, the operation of the system is the same as that of the embodiment of the invention illustrated, that is, after edge crossings have been determined, straight sided figures are simulated by the computer and characteristic points determined. Thereafter, these points are compared with the theoretical points stored in the computer and the rotational and translational movements needed to correct the position of the board are calculated and employed to position a table arrangement such as shown in FIG. 11.

The positioning method of the present invention has a number of important advantages. To start with, the system can impart to the object both translational and rotational movements. This, of course, makes it possible more accurately to place an object in a desired position.

The positioning method of the invention also includes many different ways of automatically inspecting of the object during the positioning thereof to determine whether the object is acceptable. For example, the object is rejected if an edge is further than a given distance from its theoretical position. The object is rejected if the terminal area is dimensionally different in length or width by greater than a given amount from a theoretically perfect terminal area. Finally, if the calculations show that the object cannot be moved into a position suitably close to the desired one, it automatically is discarded.

The positioning method of the invention also permits more accurate positioning than prior methods for a number of reasons. The idea of obtaining a pair of crossings per edge and simulating a straight edged model rather than depending on only a single reading to locate an edge, provides a desirable averaging effect, cancels out the effects of edge unevenness and locates the edge more precisely. The mathematical method described of positioning the object also allows a correction to be made of the object's position on a "best fit" basis. This too permits better positioning than is possible by basing the positioning of the object on the location of single edges.

APPENDIX

Figure 9:
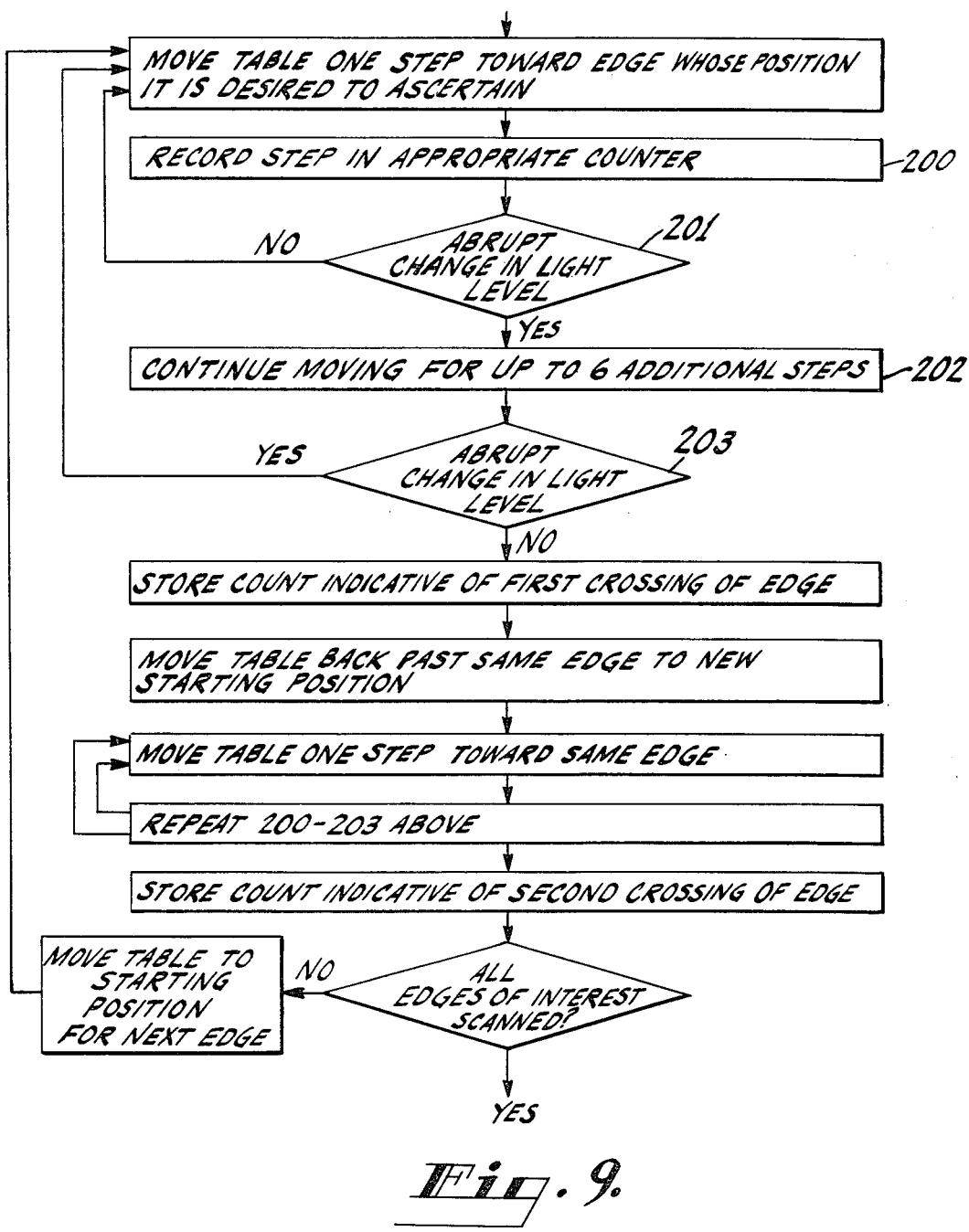
Figure 10:
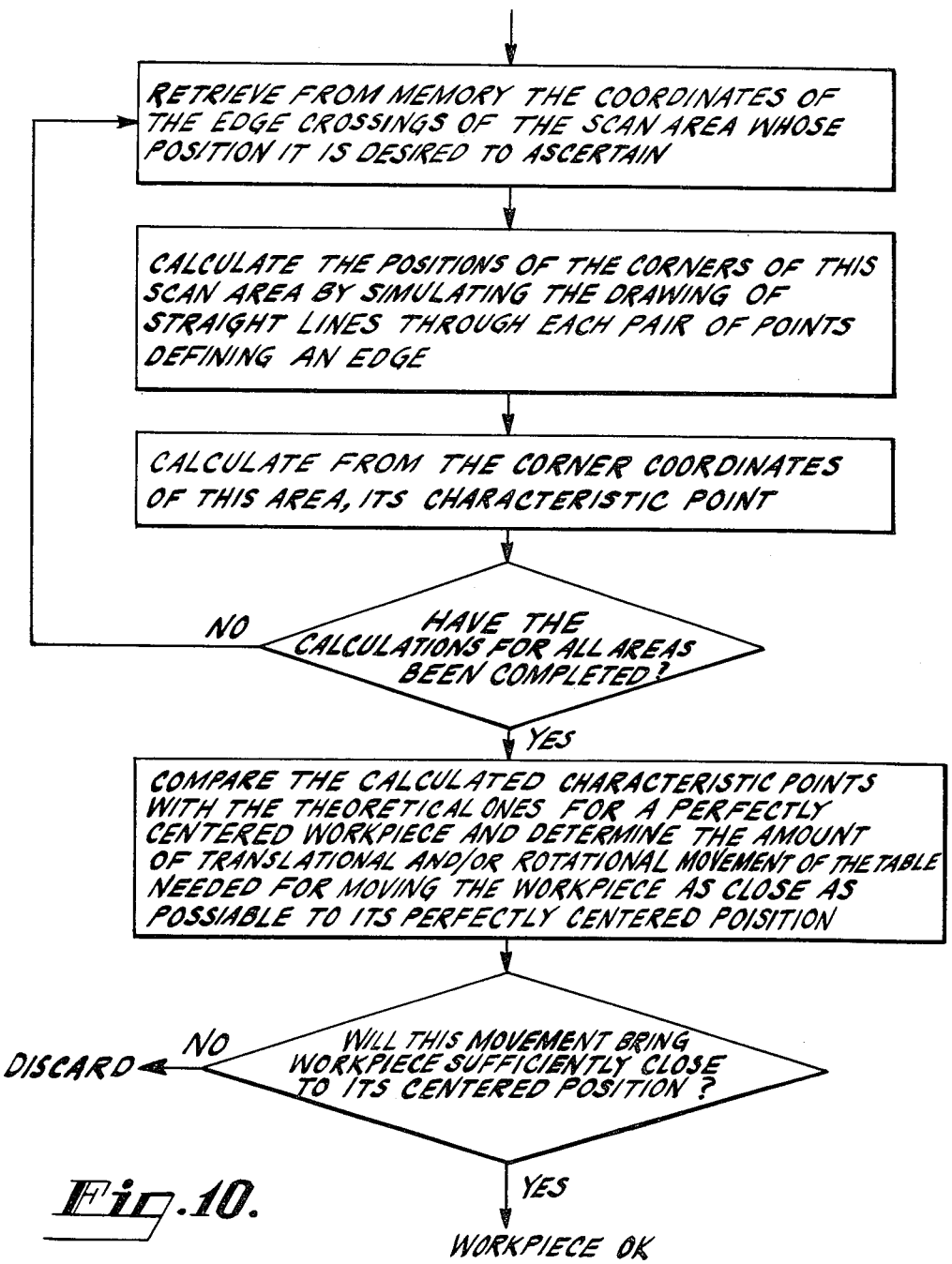
Figure 13:
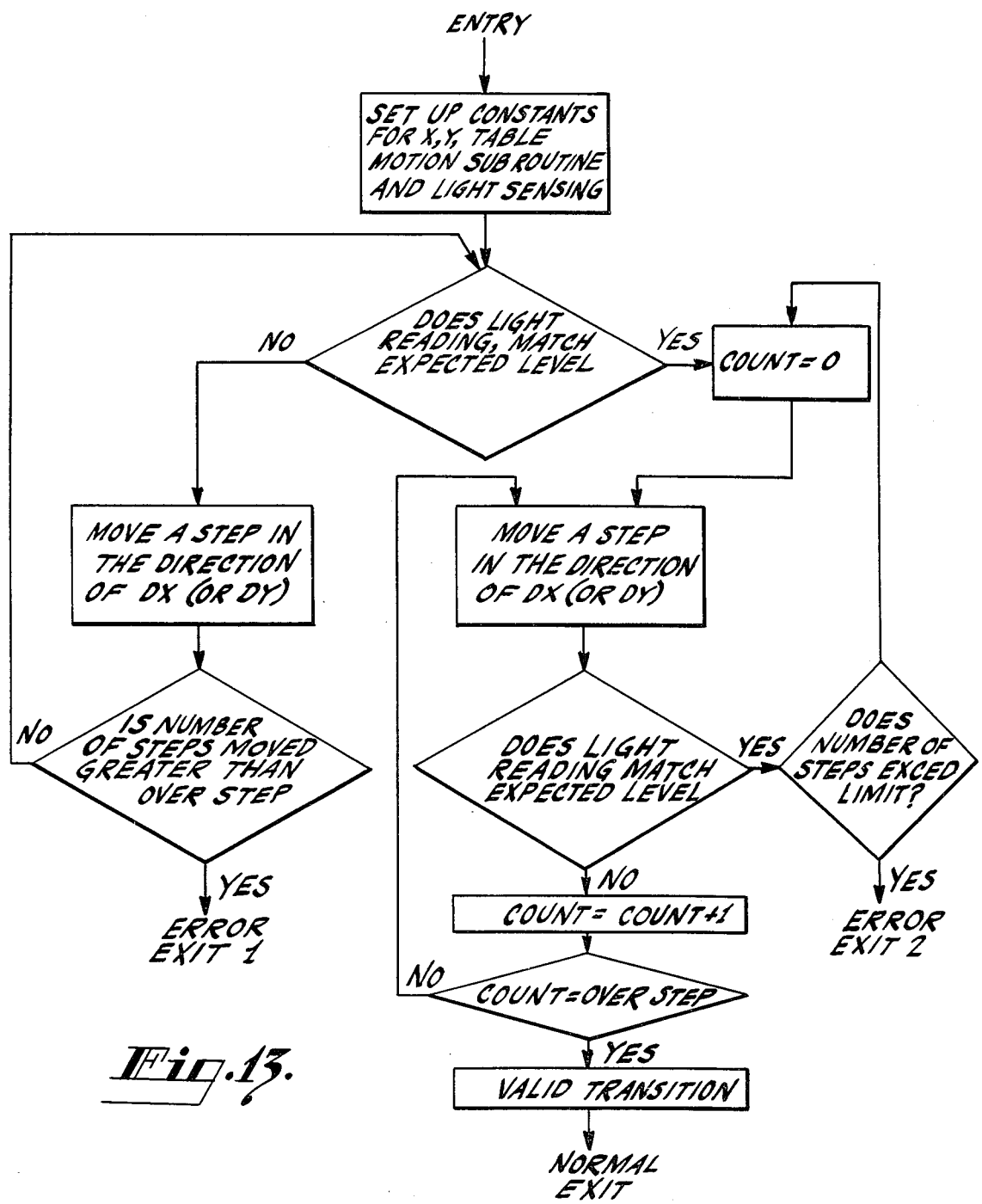

The PAL-3 assembler listing which follows for the PDP-8 computer, is the program for implementing the flow chart of FIG. 9, down through block 203. The more detailed flow chart of FIG. 13 is for the purpose of assisting the reader more easily to follow the assembler listing. Referring also to FIG. 1, the portion of the scanning motion controlled by the program can be from point B to point C. As discussed in more detail below, this same program, with different input parameters, may be employed to control any of the solid line scans such as C to D, E to F, G to H and so on shown in FIG. 1. This program hereafter is termed the S or SLOW scanning subprogram.

| Memory Location | Machine Code | Assembly Source Listing |
|---|---|---|
| | | /SLOW SCANNING ROUTINES |
| | | *31 |
| 0031 | 5600 | CSCAN |
| 0032 | 5614 | HSCAN |
| | | *36 |
| 0036 | 6324 | CLIGHT |
| | | *41 |
| 0041 | 6314 | HLIGHT |
| | | *53 |
| 0053 | 0000 | HDXHI,0 |
| | | *104 |
| 0104 | 0000 | 0 /COUNTER |
| 0105 | 0000 | 0 /OVERSTEP INDICATOR |
| 0106 | 0000 | 0 /DX LO SAVE |
| 0107 | 0000 | 0 /DY LO SAVE |
| | | *170 |
| 0170 | 0000 | CDXHI,0 |
| | | *174 |
| 0174 | 0000 | OVRST,0 /OVERSTEP STORE |
| | | *176 |
| 0176 | 0003 | COVRST,3 |
| 0177 | 0010 | HOVRST,10 /INPUT: LINK=0 EXPECTS LIGHT, 1 EXPECTS DARK /SCAN LIMIT IN DELTA |
| | | *5600 |
| 5600 | 0000 | CSCAN,0 |
| 5601 | 7200 | CLA |
| 5602 | 1364 | TAD CMIC |
| 5603 | 3343 | DCA MI |
| 5604 | 1366 | TAD CLIC |
| 5605 | 3353 | DCA LI |
| 5606 | 1176 | TAD COVRST |
| 5607 | 3174 | DCA OVRST |
| 5610 | 1200 | TAD CSCAN |
| 5611 | 3214 | DCA HSCAN |
| 5612 | 1372 | TAD CDEL |
| 5613 | 5225 | JMP HST |
| 5614 | 0000 | HSCAN, 0 |
| 5615 | | |
| 5616 | 1363 | TAD HMIC |
| 5617 | 3343 | DCA MI |
| 5620 | 1365 | TAD HLIC |
| 5621 | 3353 | DCA LI |
| 5622 | 1177 | TAD HOVRST |
| 5623 | 3174 | DCA OVRST |
| 5624 | 1371 | TAD HDEL |
| 5625 | 3100 | HST,DCA 100 |
| 5626 | 7001 | IAC |
| 5627 | 7430 | SZL |
| 5630 | 7240 | STA |
| 5631 | 3130 | DCA 130 /+1=LIGHT, −1 =DARK |
| 5632 | 1373 | TAD DELADR |
| 5633 | 3017 | DCA 17 |
| 5634 | 1367 | TAD M4 |
| 5635 | 3127 | DCA 127 |
| 5636 | 1100 | TAD 100 |
| 5637 | 3417 | DCA I 17 |
| 5640 | 2100 | ISZ 100 |
| 5641 | 2127 | ISZ 127 |
| 5642 | 5236 | JMP .−4 |
| 5643 | 1775 | TAD I DXLO |
| 5644 | 3106 | DCA 106 |
| 5645 | 1777 | TAD I DYLO |
| 5646 | 3107 | DCA 107 |
| 5647 | 1174 | TAD OVRST |
| 5650 | 7041 | CIA |
| 5651 | 3104 | DCA 104 |
| 5652 | 4352 | S2,JMS MATCH |
| 5653 | 5260 | JMP S3 /MATCH |
| 5654 | 4305 | JMS MOVE /NO MATCH |
| 5655 | 2104 | ISZ 104 |
| 5656 | 5252 | JMP S2 |
| 5657 | 5614 | JMP I HSCAN /LIGHT LEVEL ERROR |
| 5660 | 2214 | S3,ISZ HSCAN |
| 5661 | 1106 | TAD 106 |
| 5662 | 7450 | SNA |
| 5663 | 1107 | TAD 107 |
| 5664 | 7500 | SMA |
| 5665 | 7041 | CIA |
| 5666 | 3104 | DCA 104 |
| 5667 | 4305 | S4,JMS MOVE |
| 5670 | 4352 | JMS MATCH |
| 5671 | 5302 | JMP S5 /MATCH |
| 5672 | 2105 | ISZ 105 /NO MATCH |
| 5673 | 1174 | TAD OVRST |
| 5674 | 7041 | CIA |
| 5675 | 1105 | TAD 105 |
| 5676 | 7640 | SZA CLA |
| 5677 | 5302 | JMP .+3 |
| 5700 | 2214 | ISZ HSCAN |
| 5701 | 5614 | JMP I HSCAN /XSITION FOUND |
| 5702 | 2104 | S5, ISZ 104 |
| 5703 | 5267 | JMP S4 |
| 5704 | 5614 | JMP I HSCAN /XSITION NOT FOUND |
| 5705 | 0000 | MOVE,0 |
| 5706 | 1106 | TAD 106 |
| 5707 | 7450 | SNA |
| 5710 | 5331 | JMP YC |
| 5711 | 7710 | SPA CLA |
| 5712 | 5321 | JMP XN |
| 5713 | 3774 | DCA I DXHI |
| 5714 | 7001 | IAC |
| 5715 | 3775 | YSET,DCA I DXLO |
| 5716 | 3776 | DCA I DYHI |
| 5717 | 3777 | DCA I DYLO |
| 5720 | 5343 | JMP MI |
| 5721 | 7240 | XN,STA |
| 5722 | 3774 | DCA I DXHI |
| 5723 | 7240 | STA |
| 5724 | 5315 | JMP YSET |
| 5725 | 7240 | YN,STA |
| 5726 | 3776 | DCA I DYHI |
| 5727 | 7240 | STA |
| 5730 | 5340 | JMP XSET |
| 5731 | 1107 | YC,TAD 107 |
| 5732 | 7450 | SNA |
| 5733 | 5614 | JMP I HSCAN /BOTH LIMITS ZERO |
| 5734 | 7710 | SPA CLA |
| 5735 | 5325 | JMP YN |
| 5736 | 3776 | DCA I DYHI |
| 5737 | 7001 | IAC |
| 5740 | 3777 | XSET,DCA I DYLO |
| 5741 | 3774 | DCA I DXHI |
| 5742 | 3775 | DCA I DXLO |
| 5743 | 0000 | MI,0 /JMS FAST |
| 5744 | 4446 | JMS I 46 /ERROR |

| Address | | MNEMONIC | |
|---|---|---|---|
| 5745 | 1370 | TAD DELAY | |
| 5746 | 7001 | IAC | |
| 5747 | 7440 | SZA | |
| 5750 | 5346 | JMP .−2 | |
| 5751 | 5705 | JMP I MOVE | |
| | | /SUBROUTINE | |
| | | MATCH /RETURNS | |
| | | TO JMS+1 ON MATCH | |
| | | /RETURNS TO JMS+2 | |
| | | ON NO MATCH | |
| 5752 | 0000 | MATCH,0 | |
| 5753 | 0000 | LI,0 /LIGHT CALL | |
| 5754 | 1130 | TAD 130 | |
| 5755 | 7650 | SNA CLA | |
| 5756 | 5361 | JMP .+3 /NO MATCH | |
| 5757 | 3105 | DCA 105 /MATCH | |
| 5760 | 7410 | SKP | |
| 5761 | 2352 | ISZ MATCH | |
| 5762 | 5752 | JMP I MATCH | |
| 5763 | 4435 | HMIC,JMS I 35 | |
| 5764 | 4434 | CMIC,JMS I 34 | |
| 5765 | 4441 | HLIC,JMS I 41 | |
| 5766 | 4436 | CLIC,JMS I 36 | |
| 5767 | 7774 | M4,−4 | |
| 5770 | 0000 | DELAY,0 | |
| 5771 | 0053 | HDEL,HDXHI | |
| 5772 | 0170 | CDEL,CDXHI | |
| 5773 | 5773 | DELADR,DELADR | |
| 5774 | 0000 | DXHI,0 | |
| 5775 | 0000 | DXLO,0 | |
| 5776 | 0000 | DYHI,0 | |
| 5777 | 0000 | DYLO,0 | |
| | | /LIGHT | |
| | | SUBROUTINES | |
| | | /OUTPUT IN AC, | |
| | | −1 DARK, +1 LIGHT | |
| | | *6314 | |
| 6314 | 0000 | HLIGHT,0 | |
| 6315 | 7300 | CLA CLL | |
| 6316 | 6372 | 6372 | |
| 6317 | 7010 | RAR /11th BIT | |
| | | 1=DARK, 0=LIGHT | |
| 6320 | 7201 | CLA IAC | |
| 6321 | 7430 | SZL | |
| 6322 | 7240 | STA | |
| 6323 | 5714 | JMP I HLIGHT | |
| 6324 | 0000 | CLIGHT,0 | |
| 6325 | 7300 | CLA CLL | |
| 6326 | 6372 | 6372 | |
| 6327 | 7012 | RTR/10TH BIT 1-DARK, 0-LIGHT | |
| 6330 | 7201 | CLA IAC | |
| 6331 | 7430 | SZL | |
| 6332 | 7240 | STA | |
| 6333 | 5724 | JMP I CLIGHT | |

In the PAL-3 listing above, the following subprograms are referred to:

CLIGHT — Reads the optic fiber at the current coordinate position and records
+1 in AC if Light
−1 in AC if Dark
where AC refers to the accumulator in the PDP 8 computer.

CMIC — Moves the chip an amount stored in memory locations DX and DY and updates the X and Y counters accordingly. (DX and DY are discussed below.)

MATCH — Compares a number indicative of the present light level with a number indicative of original light level. If the same, returns to the instruction following the call. If not, returns to the next instruction following the call. (The term "call" refers to transfer of control to a subroutine.)

The starting conditions for the listing above are that the number stored in one location such as DX is zero and the number stored in the other location (DY in this case) is a value different than zero. The sign (plus or minus) of the nonzero number is used to determine the direction of motion. Its magnitude is used as a "limit check," that is, if no light transition occurs within a number of steps called for by the number, an error is known to exist.

The symbol list and definition for the PAL-3 listing above is:

| | | |
|---|---|---|
| 5600 | CSCAN | Entry point for substrate scanning. |
| 5764 | CMIC | Contains instruction linking to subroutine for motion of substrate in a specified direction and for a specified distance. |
| 5766 | CLIC | Contains instruction linking to subroutine for examining light output of optic fiber positioned over the substrate. |
| 176 | COVRST | Substrate overstep constant - indicates how many additional steps must be taken after a light transition has been detected. |
| 5772 | CDEL | Contains the address of the 1st word of DX. |
| 170 | CDXHI | High-order word for X (Input) |
| 171 | CDXLO | Low-order word for X (Input) |
| 172 | CDYHI | High-order word for Y (Input) |
| 173 | CDYLO | Low-order word for Y (Input) |

In brief, the listing above includes (at memory locations 5652–5660) the instructions for an initial light level check as indicated in the top part of the flow chart of FIG. 7 and also in FIG. 13. If the input levels and the light reading do not match, the substrate is moved one step in the direction called for by the input, and the light level is again checked. If there is a match, the edge finding routine below is followed. If no match persists for three steps, then control is returned to an error exit routine.

The listing also describes the movement of the substrate in one of four directions +X, −X, +Y, −Y, one step at a time, until a light level different than the one originally supplied as an input is detected. If this change in light level persists for at least the number of steps specified in "COVRST," then control is returned to the normal exit routine. If, however, no change is detected within the allowable number of steps (this allowable number is supplied as an input), then control is returned to an error exit routine. Each step which is moved is recorded and the "counter" for that step is updated accordingly. The counter may be one of the counters (X or Y) shown in FIG. 11. Alternatively, the "counter" may instead represent a portion of the main memory which stores the count and whose contents is changed by 1 for each step in the particular direction the table is moved.

To accomplish the task of finding two crossings per edge as depicted in FIG. 1 and as described in the portion of the flow chart of FIG. 9 after block 203, two subprograms are used. The first is the slow scanning subprogram S, the details of which are given above, and the second is a subprogram that is employed to drive either or both of the X and Y stepping motors 72 and 74 (FIG. 11) in a fast, non-scanning mode as specified by certain inputs to the program. These inputs tell the amount and direction of movements desired in the X and Y directions and are stored in two memory locations DX and DY respectively, where DX stores a number indicative of the amount of X movement and DY stores a number indicative of the amount of Y movement. The sign, plus or minus, is also stored and it indicates the direction of each movement.

The program for fast movement in the non-scanning mode as described above and as indicated by the dashed lines in FIG. 1 is known as the F or FAST program. Because this program is quite straightforward and relatively simple, the specific steps are not listed herein. It consists merely of instructions to move at a rapid rate a given distance in a given direction without sensing for a change in light level.

The scan limits, that is, the magnitude of the numbers stored in memory locations DX and DY, are dependent a great deal on the geometry of the object it is desired to scan. Typically, in FIG. 1 if the metal area 12 on the substrate can be approximated by a rectangle whose dimensions are 0.002 inches in the X (horizontal) dimension and 0.006 inches in the Y (vertical) dimension, then the scan limits shown in the chart below represent numbers that have been arrived at somewhat empirically which yield the best results in terms of the highest percentage, on a statistical basis, of successful scans. In this chart, the columns DX and DY indicate the actual numbers stored in memory locations DX and DY. For example, the number 200 under DX means that the substrate is to be driven by 200 pulses (corresponding to a distance of 200 × 0.0001 IN = 0.02 IN) in the +X direction. The chart also identifies the subprograms employed. In each case the F or FAST subprogram is used for the movement illustrated by the dashed lines in FIG. 1 and the S or SLOW subprogram is used for the movement illustrated by the solid lines in FIG. 1.

| STARTING POINT | DX (.0001") | DY (.0001") | SUB-PROGRAM CALLED | ENDING POINT | COMMENTS |
|---|---|---|---|---|---|
| A | 200 | 0 | F | B | Move from substrate body to point near beam |
| B | 100 | 0 | S | C | Typically, 100 in DX represents about twice the length of segment BC. Locates crossing 19 |
| C | 0 | −3 | F | C' | Position more closely to next edge |
| C' | 0 | −50 | S | D | Locates crossing 21 |
| D | 20 | 30 | F | E | |
| E | 0 | −50 | S | F | Locates crossing 22 |
| F | 20 | 30 | F | G | |
| G | −50 | 0 | S | H | Locates crossing 23 |
| etc. | | | | | |

The actual programs for the various calculations described in the specification are not given here. In general, they involve routine manipulations of numbers as, for example, addition, subtraction and so on, the actual programs for which are quite straightforward and readily formulated by persons of ordinary skill in the art. Similarly, the program for correcting the table position in X, Y and $\theta$ in response to the results of these calculations is straightforward and involves merely the steps in a subroutine which directs the three drive motors to move the tables determined in advance distances (plus or minus in X and Y directions and through a determined in advance angle $\theta$.

What is claimed is:

1. A machine implemented method for placing in a desired position, relative to a fixed frame of reference, an object having a plurality of regions thereon, each such region defined by a plurality of peripheral edges, comprising the steps of:

storing in said machine signal manifestations indicative of the theoretical values relative to a fixed point of reference of the coordinates of a plurality of characteristic points, one such point per region, of an object in a desired position, where all characteristic points have the same mathematical relationship to the peripheral edges of their respective regions;

scanning, under machine control, a plurality of said regions, each scan of a region including scans which cross each of a plurality of edges of a region at a pair of spaced points;

producing, in response to the scans which cross the edges at said pairs of spaced points, signal manifestations indicative of the coordinates of each said pair of crossings, with respect to said fixed point of reference;

simulating, under machine control, from the signal manifestations indicative of the values of the coordinates defining the pairs of edge crossings for each region, a straight edged figure representing each region, whose edges pas through the coordinates defining the pairs of edge crossings for that region;

producing, under machine control, from each simulated straight edged figure, signal manifestations indicative of the coordinates, relative to said fixed point of reference, of the characteristic point of the region represented by that figure;

producing, under machine control, from the signal manifestations indicative of the coordinates defining the characteristic points for a plurality of said regions and from said stored signal manifestations indicative of the theoretical values of the coordinates of the corresponding characteristic points, signal manifestations indicative of the direction and amount of movement needed to bring said object into a position which relatively closely matches that of said desired object position; and in response to said signal manifestations, imparting said amount of movement in said direction to said object.

2. A machine implemented method as set forth in claim 1 wherein said step of storing signal manifestations indicative of the coordinates of a plurality of characteristic points comprises the step of storing signal manifestations indicative of the coordinates of the center of gravity of each region, and said step of producing, from each straight edged figure, signal manifestations indicative of the coordinates of the characteristic point of the region represented by that figure, comprises the step of producing signal manifestations indicative of the coordinates of the center of gravity of the region represented by that figure.

3. A machine implemented method as set forth in claim 1 wherein said step of storing signal manifestations indicative of the coordinates of a plurality of characteristic points comprises the step of storing signal manifestations indicative of the coordinates of the center of one particular edge of each region, and said step of producing from each straight edged figure signal manifestations indicative of the coordinates of the characteristic point of the region represented by that figure comprises the step of producing signal manifestations indicative of the coordinates of the center of the corresponding edge of the region represented by that figure.

4. A machine implemented method as set forth in claim 2 wherein the producing, under machine control, from each straight edged figure signal manifestations indicative of the coordinates $X_{CG}$, $Y_{CG}$ of the center of gravity of the region represented by that figure comprises the steps of:

producing, under machine control, signal manifestations indicative of the X and Y coordinates of the n corners of said straight sided figure;

producing, under machine control, from the signal manifestations indicative of said X coordinates, signal manifestations indicative of $X_{CG}$, as follows:

$X_{CG} = (X_1 + X_2 \ldots + X_n/n)$ where $X_1, X_2 \ldots X_n$ are said X coordinates of said $n$ corners; and producing, under machine control, from the signal manifestations indicative of said Y coordinates, signal manifestations indicative of $Y_{CG}$, as follows:

$Y_{CG} = (Y_1 + Y_2 \ldots + Y_n/n)$ where $Y_1, Y_2 \ldots Y_n$ are the Y coordinates of the $n$ corners.

5. In a machine implemented method for placing in a desired position, relative to a fixed frame of reference, an object having a plurality of distinguishable regions thereon, the steps of:

storing in said machine signal manifestations indicative of the theoretical values, relative to a fixed point of reference, of the coordinates of a plurality of characteristic points, one such point per region, of an object in a desired position, where all characteristic points have the same mathematical relationship to the peripheral edges of their respective regions;

scanning, under machine control, a plurality of said regions and producing, in response to the scanning of each region, signal manifestations indicative of the actual location, relative to said fixed point of reference, of the characteristic point of that region;

producing, under machine control, from the signal manifestations indicative of the coordinates defining the characteristic points for a plurality of said regions and from said stored signal manifestations indicative of the theoretical values of the coordinates of corresponding characteristic points, signal manifestations indicative of the direction and amount of rotational movement needed to reduce the average rotational displacement between the actual coordinates of the characteristic points and the theoretical coordinates of said characteristic points; and in response to said signal manifestations indicative of movement, imparting said amount of rotational movement, in said direction, to said object.

6. In a machine implemented method as set forth in claim 5, the further steps of:

producing, under machine control, from the signal manifestations indicative of the coordinates defining the characteristic points for a plurality of said regions and from said stored signal manifestations indicative of the theoretical values of corresponding characteristic points, signal manifestations indicative of the direction and amount of translational movement needed to reduce the average translational displacement between the characteristic points and the theoretical points; and in response to said signal manifestations indicative of translational movement, imparting said amount of translational movement, in said direction, to said object.

7. A machine implemented method for inspecting an object having a plurality of distinguishable regions thereon for ascertaining whether the relative locations of said regions fall within given distance and direction limits from a point of reference comprising the steps of:

storing in said machine signal manifestations indicative of the theoretical values, relative to a fixed point of reference, of the desired coordinates of a plurality of characteristic points, one such point per region, where all characteristic points have the same mathematical relationship to the peripheral edges of their respective regions;

storing in said machine limit signal manifestations indicative of the permitted displacement of said plurality of characteristic points from said desired positions for an object to be acceptable;

scanning, under machine control, a plurality of regions and producing, in response to the scanning of each region, signal manifestations indicative of the actual location, relative to said fixed point of reference, of the characteristic point of that region;

producing, under machine control, from the signal manifestations indicative of the theoretical values of said coordinates of the characteristic points, the signal manifestations indicative of the actual values of said coordinates of the corresponding characteristic points, and said limit signal manifestations, an indication of whether or not said object is acceptable; and in response to said indication, accepting or rejecting said object.

8. In a machine implemented method for inspecting an object having a plurality of distinguishable regions thereon, the steps of:

storing in said machine signal manifestations indicative of the desired shapes and positions of said regions;

scanning, under machine control, a plurality of said regions for producing signal manifestations indicative of the actual shape and position of each region;

comparing, under machine control, the produced and corresponding stored signal manifestations; and if the produced and corresponding stored signal manifestations differ from one another by more than a given amount, producing, under machine control, a signal manifestation indicating that the object should be rejected.

9. In a machine implemented method as set forth in claim 8, performing the comparing step and the step of producing a signal manifestation indicating that the object should be rejected, after at least some but not all of the steps in the scanning process have been completed.

10. A machine implemented method for inspecting an object having a plurality of regions thereon, each region having peripheral edges, comprising the steps of:

storing in said machine digital signal manifestations indicative of the desired outline dimensions of a plurality of regions on an object;

scanning, under machine control, a plurality of said regions for producing digital signal manifestations indicative of the outline dimensions of said scanned regions;

comparing, under machine control, the produced and corresponding stored digital signal manifestations; and if the produced and corresponding stored signal manifestations differ from one another by more than a given amount, producing, under machine control, a signal manifestation indicating that the object should be rejected.

11. A machine implemented method as set forth in claim 10, wherein said scanning under machine control includes:

producing, under machine control, digital signal manifestations indicative of the coordinates of two points along each of a plurality of edges of a plurality of regions;

producing for each pair of points, a digital manifestation indicative of the length of a straight line passing through that pair of points, which straight line represents an edge of a region; and wherein the step of comparing the produced and stored digital signal manifestations comprises comparing the digital signal manifestation indicative of the length of each edge of a region with a store digital signal manifestation for ascertaining whether the length of that edge is within acceptable limits.

* * * * *